(12) United States Patent
Kubo

(10) Patent No.: US 12,704,758 B2
(45) Date of Patent: Aug. 11, 2026

(54) ELECTROCHROMIC DEVICE, LENS UNIT, IMAGING DEVICE, WINDOW MEMBER, AND METHOD OF DRIVING ELECTROCHROMIC ELEMENT

(71) Applicant: CANON KABUSHIKI KAISHA, Tokyo (JP)

(72) Inventor: Wataru Kubo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 698 days.

(21) Appl. No.: 18/046,754

(22) Filed: Oct. 14, 2022

(65) Prior Publication Data

US 2023/0126380 A1 Apr. 27, 2023

(30) Foreign Application Priority Data

Oct. 21, 2021 (JP) ................................ 2021-172245

(51) Int. Cl.
*G02F 1/163* (2006.01)
*G02F 1/1516* (2019.01)

(52) U.S. Cl.
CPC ............ *G02F 1/163* (2013.01); *G02F 1/1516* (2019.01); *G02F 2001/1635* (2013.01)

(58) Field of Classification Search
None
See application file for complete search history.

(56) References Cited

U.S. PATENT DOCUMENTS 4,923,289 A 5/1990 Demiryont
9,678,402 B2 6/2017 Yamamoto
10,151,958 B2 12/2018 Yamamoto et al.
10,437,127 B2 10/2019 Miyazaki et al.
10,684,526 B2 6/2020 Yamamoto et al.
2018/0196323 A1* 7/2018 Wang ...................... G02F 1/163
2020/0033686 A1 1/2020 Yamamoto
2021/0294008 A1 9/2021 Kubo

FOREIGN PATENT DOCUMENTS

JP 61-254935 A 11/1986
JP 1-277825 A 11/1989
JP 2002-537582 A 11/2002
JP 2012-42814 A 3/2012
JP 2018-159727 A 10/2018
JP 2020-016805 A 1/2020
JP 2020-095253 A 6/2020
JP 6727755 B2 7/2020

OTHER PUBLICATIONS

Notice of Reasons for Refusal in Japanese Application No. 2021-172245 (Jun. 2025).
Decision of Refusal in Japanese Application No. 2021-172245 (Dec. 2025).

* cited by examiner

*Primary Examiner* — Dung T Nguyen
(74) *Attorney, Agent, or Firm* — Venable LLP

(57) ABSTRACT

The present disclosure repeatedly supplies, when controlling gradation of transmittance, a first voltage for advancing an electrochemical reaction for decreasing transmittance of an electrochromic layer and a second voltage for advancing an electrochemical reaction for increasing the transmittance of the electrochromic layer, in a time domain in which the electrochemical reaction of the electrochromic layer in the electrodes progresses in the first region and transmittance change of the first region is not visible.

16 Claims, 9 Drawing Sheets

1000
1006
1001
1002
1005
1009
1004
1010

EXAMPLE 1
TRANSMITTANCE
DISTANCE d
0.0
0.2
0.4
0.6
0.8
1.0
0.55
0.6
0.65
0.7
0.75

COMPARATIVE EXAMPLE 1
TRANSMITTANCE
DISTANCE d
0.0
0.2
0.4
0.6
0.8
1.0
0.5 V
0.6 V
0.7 V
0.8 V
0.9 V

ELECTROCHROMIC DEVICE, LENS UNIT, IMAGING DEVICE, WINDOW MEMBER, AND METHOD OF DRIVING ELECTROCHROMIC ELEMENT

BACKGROUND OF THE INVENTION

Field of the Invention

The present invention relates to an electrochromic device, a lens unit, an imaging device, a window member, and a method of driving an electrochromic element.

Description of the Related Art

An electrochromic (hereinafter sometimes abbreviated as "EC") element is known, which uses an electrochromic material in which the properties of optical absorption (absorption wavelength, absorbance) of a substance change due to electrochemical oxidation-reduction reaction. The EC element is applied to a display device, a variable reflectance mirror, a variable transmission window, a variable ND (Neutral Density) filter, and the like by utilizing a characteristic that a high transmittance at the time of decoloring and a low transmittance at the time of coloring can be compatible.

As a kind of ND filter, there is an optical filter called a gradation filter which gives a gradation to the light transmittance in the filter. Examples of the gradation filter used in a camera, and the like include an apodization filter that softens the outline of the blur of an acquired image and a half ND filter that partially reduces the amount of light. If the transmittance gradation of such a gradation filter can be controlled electronically, the width of the image representation can be enlarged.

An electronic variable aperture is known as an optical filter configured to partially change the transmittance of a variable transmittance region of an electrochromic element. Japanese Patent Application Laid-Open No. 2002-537582 discloses a variable aperture in which interconnections are arranged along a pair of electrodes and a peripheral seal thereof. This variable aperture controls a part of the variable transmittance region of the electrochromic element into a continuous transmittance gradation by using the resistance of the electrode. Specifically, the low transmittance region can be widened (the high transmittance region can be limited or narrowed) by increasing the effective voltage of the electrode by applying a direct current, which is a typical driving method of the EC element, or applying a pulse width modulation voltage of the drive voltage/open circuit voltage.

However, when the low transmittance region of the gradation filter is widened by the driving method disclosed in Japanese Patent Application Laid-Open No. 2002-537582, the maximum transmittance (at the center) also decreases. This decrease in the maximum transmittance decreases the amount of transmitted light in the central region where high transmittance is desired. Therefore, the electrochromic element such as that disclosed in Japanese Patent Application Laid-Open No. 2002-537582 has a problem that, when applied to a lens or a camera, the image quality of the acquired image is reduced due to a reduction in signal.

An object of the present invention is to provide an EC device capable of reducing the influence on the maximum transmittance of an EC element when controlling the light transmission region.

SUMMARY OF THE INVENTION

According to one disclosure of the present specification, there is provided an electrochromic device including: an electrochromic element including a pair of electrodes, an electrochromic layer disposed between the pair of electrodes, and interconnections connected to the pair of electrodes; and a driving circuit that is connected to the pair of electrodes and supplies voltages to the pair of electrodes via the interconnections, wherein the electrochromic element is an electrochromic element that forms a gradation of transmittance in a transmittance changing portion where the electrochromic layer is disposed, by resistance of the electrodes, wherein the transmittance changing portion has a first region for forming a first light transmissive state at a position in the electrodes close to the interconnections in the transmittance changing portion, and a second region for forming a second light transmissive state at a position in the electrodes farther from the interconnections than the first region, and wherein, the driving circuit repeatedly supplies, when controlling the gradation of the transmittance, a first voltage for advancing an electrochemical reaction for decreasing transmittance of the electrochromic layer and a second voltage for advancing an electrochemical reaction for increasing the transmittance of the electrochromic layer, in a time domain in which the electrochemical reaction of the electrochromic layer in the electrodes progresses in the first region and transmittance change of the first region is not visible.

According to another disclosure of the present specification, there is provided a driving method of an electrochromic element including a pair of electrodes, an electrochromic layer disposed between the pair of electrodes, and interconnections connected to the pair of electrodes, wherein the electrochromic element is an electrochromic element that forms a gradation of transmittance in a transmittance changing portion where the electrochromic layer is disposed, by resistance of the electrodes, and wherein the transmittance changing portion has a first region for forming a first light transmissive state at a position in the electrodes close to the interconnections in the transmittance changing portion, and a second region for forming a second light transmissive state at a position in the electrodes farther from the interconnections than the first region, the driving method comprising: repeatedly supplying, when supplying voltages to the pair of electrodes via the interconnections and controlling the gradation of the transmittance, a first voltage for advancing an electrochemical reaction for decreasing transmittance of the electrochromic layer and a second voltage for advancing an electrochemical reaction for increasing the transmittance of the electrochromic layer, in a time domain in which the electrochemical reaction of the electrochromic layer in the electrodes progresses in the first region and transmittance change of the first region is not visible.

Further features of the present invention will become apparent from the following description of exemplary embodiments with reference to the attached drawings.

BRIEF DESCRIPTION OF THE DRAWINGS

FIG. 8B is a schematic diagram illustrating an example of a configuration of the imaging device according to the third embodiment of the present invention.

DESCRIPTION OF THE EMBODIMENTS

First Embodiment

Figure 1:
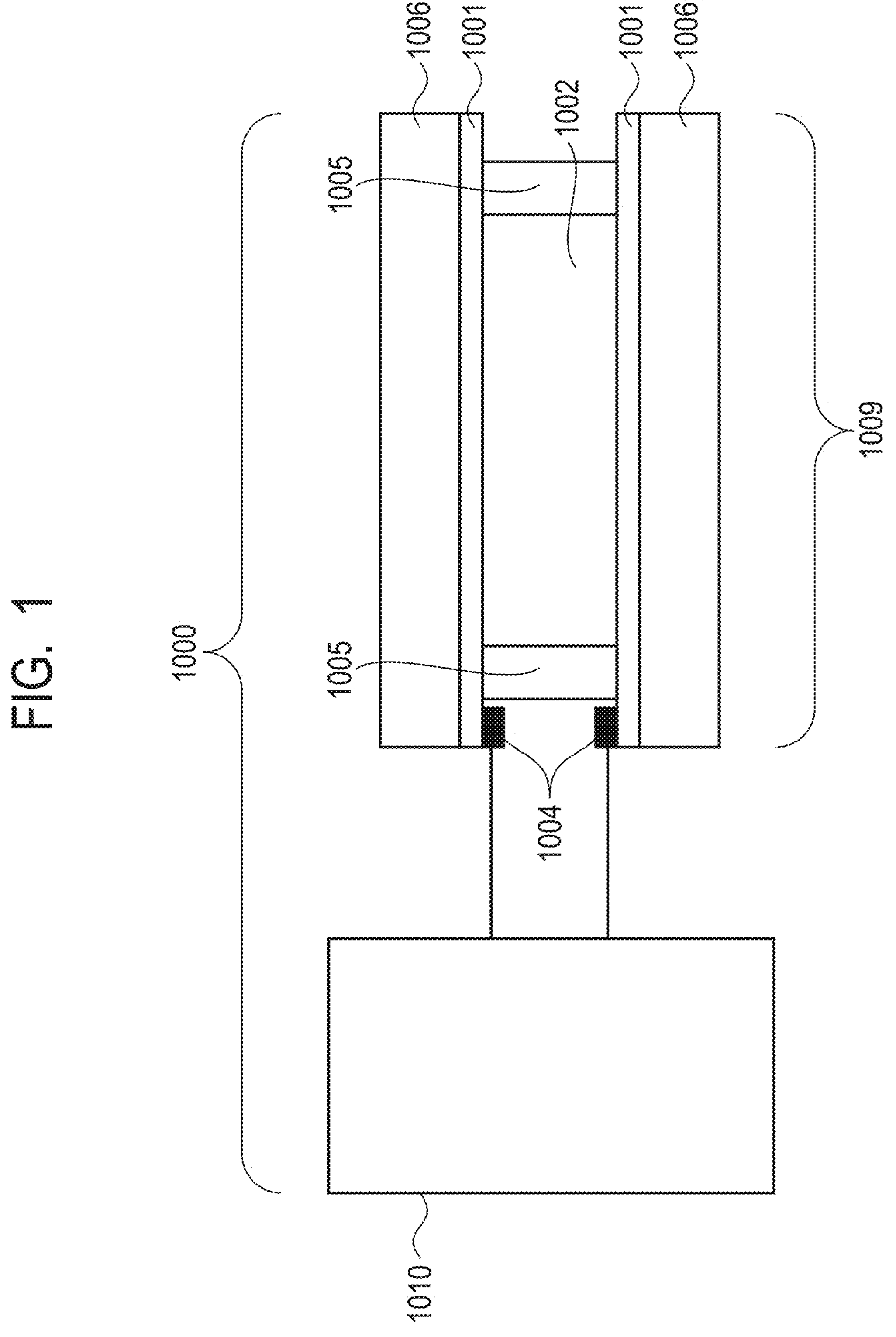
FIG. 1 is a cross-sectional view illustrating a schematic configuration of an EC device according to a first embodiment of the present invention.
Figure 2:
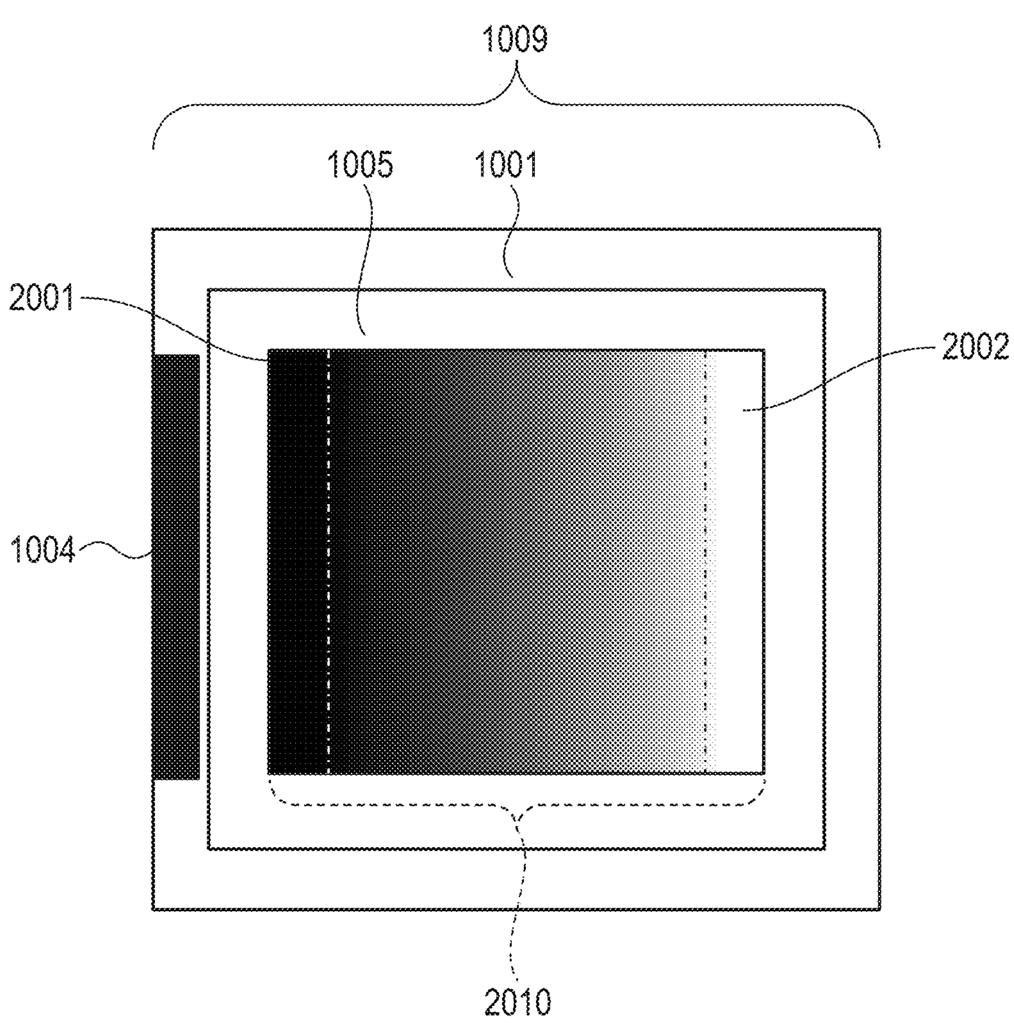
FIG. 2 is a plan view illustrating a schematic configuration of the EC device according to the first embodiment of the present invention.
Figure 3:
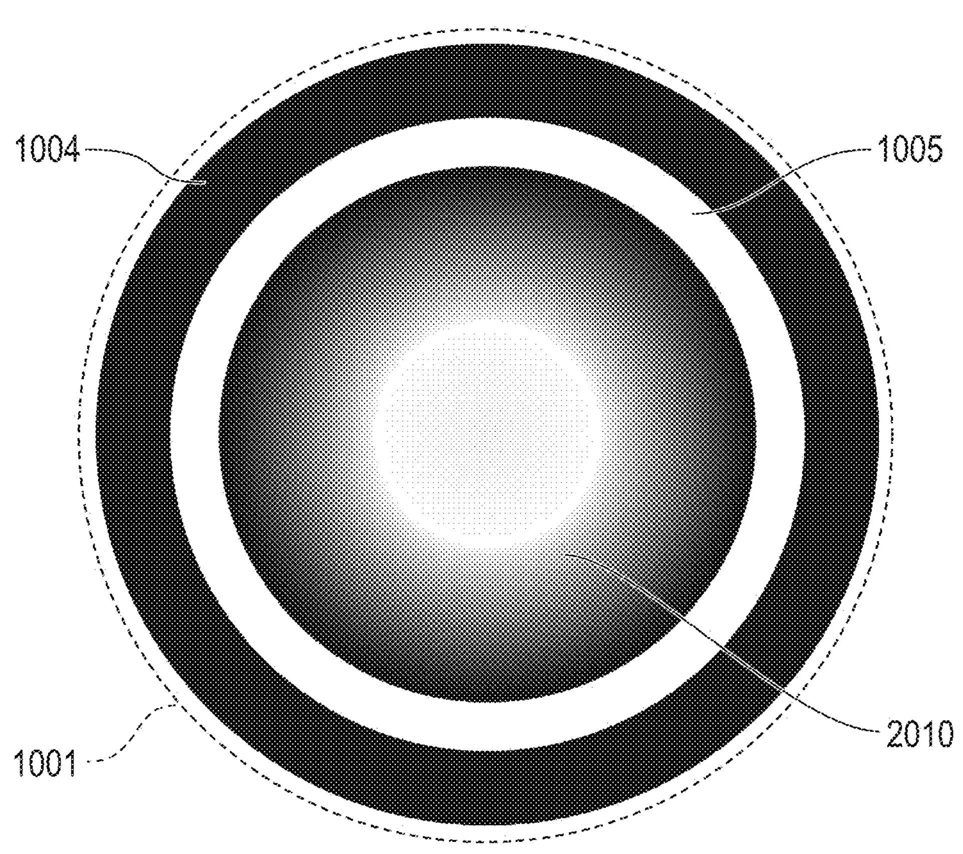
FIG. 3 is a plan view illustrating an arrangement of interconnections that forms a concentric transmission gradation.

A schematic configuration of an electrochromic device (EC device) according to a first embodiment of the present invention will be described with reference to FIG. 1 to FIG. 3. FIG. 1 is a cross-sectional view illustrating a schematic configuration of an EC device according to the present embodiment. FIG. 2 is a plan view illustrating a schematic configuration of the EC element according to the present embodiment. FIG. 3 is a plan view illustrating an arrangement of interconnections that forms a concentric transmission gradation.

As illustrated in FIG. 1, the EC device 1000 according to the present embodiment includes an electrochromic element (EC element) 1009 and a driving circuit 1010 connected to the EC element 1009.

The EC element 1009 includes a pair of electrodes 1001, an electrochromic layer (EC layer) 1002 disposed between the pair of electrodes 1001, and interconnections 1004 to which the driving circuit 1010 is connected. The driving circuit 1010 is electrically connected to the pair of electrodes 1001 via the interconnections 1004 and is thus electrically connected to the EC element 1009. Note that the EC element 1009 may include base members 1006 that support the pair of electrodes 1001, or may include a partition wall 1005 that partitions the EC layer 1002. Furthermore, the EC device 1000 may include a temperature sensor (not illustrated). In this case, the temperature sensor preferably has a function of detecting the temperature of the EC element 1009.

As illustrated in FIG. 2, the EC element 1009 according to the present embodiment is an EC element that forms a gradation of transmittance in the transmittance changing portion 2010 of the EC element 1009 by the resistance of the pair of electrodes 1001. The transmittance changing portion 2010 is a portion where the EC layer 1002 of the EC element 1009 is disposed. The transmittance changing portion 2010 has a first region 2001 for forming a first light transmissive state at a position in the electrodes 1001 close to the interconnections 1004, and a second region 2002 for forming a second light transmissive state at a position in the electrodes 1001 farther from the interconnections 1004 than the first region 2001.

Next, the EC device 1000 according to the present embodiment and its respective components will be described in more detail.

(EC Element 1009)

The EC element is an element capable of electrically changing the absorption amount of light by an electrochemical reaction of an electrochromic compound (EC compound). The EC element includes a transmission type EC element that controls the amount of transmitted light and a reflection type EC element that controls the amount of reflected light. Although the EC element according to the present embodiment may be applied to either a transmission type or a reflection type, for applications of an optical filter, a transmission type EC element is mainly used.

The electrochromic elements include that using an inorganic material and that using an organic material, and the electrochromic elements using an organic material include that using a high-molecular organic material and that using a low molecular organic material. Any electrochromic material may be used for the electrochromic element according to the present embodiment. Among them, an electrochromic element using a low molecular organic material is preferable from the viewpoint of contrast of light absorption and maximum transmittance.

The control range of the light absorptance in the EC element is not particularly limited, but preferably includes a range satisfying the performance as a partial variable transmittance filter.

For example, an ideal control range of light absorptance may be 0% to 100%, and a practical control range of light absorptance may be 0.1% to 95%. In addition, in the control of the light absorptance in these ranges, it is preferable to realize stepless gradation.

(Electrodes 1001)

The pair of electrodes 1001 are responsible for controlling the coloration and decoloration of the EC layer 1002 by a voltage application thereto. In the case of the transmission type EC element 1009, both of the pair of electrodes 1001 are formed of a transparent electrode material. In the case of the reflection type EC element 1009, at least one of the pair of electrodes 1001 is formed of a transparent electrode material. In this case, the rear-side electrode of the pair of electrodes 1001 on the optical path may be a light reflecting electrode (for example, a metal electrode). The EC element 1009 exhibits EC characteristics by applying a voltage between the pair of electrodes 1001.

The pair of electrodes 1001 are preferably made of a material having transparency, conductivity, and stability in the oxidation-reduction reaction of the electrochromic material. Examples of such a material include transparent conductive oxide materials such as indium tin oxide (ITO), fluorine-doped tin oxide, and the like. The pair of electrodes 1001 may be formed of these electrode materials with a thin metal wire or a thin metal film provided thereon to reduce the resistance value, or a transparent conductive film using another conductive material such as carbon nanotube and the like.

When the pair of electrodes 1001 are disposed over base materials (e.g., base materials 1006), the base material may be made of a material having light transmission properties.

Here, "light transmission properties" means transmitting light, and may be defined as having a light transmittance of 50% or more and 100% or less with respect to the light of the target wavelength, for example. The wavelength of the target light is the wavelength of the light targeted by the EC element 1009, and is typically the wavelength region of the visible light. Examples of specific wavelengths of light include 420 nm or more and 700 nm or less. Specifically, glass, a polymer compound, and the like may be used as the base material, and a coating such as an antireflective coating may be provided as necessary.

In the EC element according to the present embodiment, the electrode 1001 preferably has a resistance larger than that of the interconnection 1004 in order to form a transmittance gradation by the electrode resistance. The specific resistance value may vary depending on the size of the EC element 1009, the distance between the pair of electrodes 1001, the EC layer, the gradation to be formed, and the like. For example, when the EC element 1009 is applied to a filter for a camera, the electrode 1001 preferably has a resistance value of 5 Ω/square or more and 1000 Ω/square or less, more preferably 10 Ω/square or more and 200 Ω/square or less, and most preferably 20 Ω/square or more and 100 Ω/square or less.

(EC Layer 1002)

The EC layer 1002 includes a material exhibiting EC properties (EC material). The EC material includes an EC compound which is an organic EC compound or an inorganic EC compound. The EC layer 1002 may be a fixed type EC layer in which an EC compound is fixed on an electrode, or a floating type EC layer in which an EC compound dissolved in an electrolyte or the like (electrolyte solution, electrolyte gel, or the like) can move in the electrolyte or the like. A floating type EC layer is preferably used as the EC layer 1002 of the present embodiment.

Examples of materials used for the fixed type EC layer include the following. That is, in the case of the inorganic EC element, an inorganic EC compound such as tungsten oxide, iridium oxide, or the like, which is fixed on an electrode, is used for the fixed type EC layer. In the case of the organic EC element, an organic EC compound such as a polythiophene, a polyaniline, or the like which is a high-molecular EC compound, or a derivative of a pyridine salt, a derivative of an aromatic amine compound, or a derivative of a heterocyclic compound which is a low-molecular EC compound, which is fixed on an electrode, is used for the fixed type EC layer.

As an EC compound of the floating type EC layer preferably used in the present embodiment, an organic low-molecular EC compound is preferably used. As specific examples of the organic low-molecular EC compound, a derivative of a pyridine salt, a derivative of an aromatic amine compound, or a derivative of a heterocyclic compound are preferably used. The organic low-molecular EC compound may be used in a state of being dissolved in a solvent. As the solvent, a solvent of an electrolyte layer described later may be used.

The EC layer 1002 is a normally-transmissive EC layer or a normally-dimming EC layer. The normally-transmissive EC layer is an EC layer which is in a transmissive state without applying a voltage from the driving circuit and is in a dimming state by an effective voltage at the time of applying a voltage. The normally-dimming EC layer is an EC layer which is in a dimming state without applying a voltage and is in a transmissive state by an effective voltage at the time of applying a voltage. The EC layer 1002 according to the present embodiment is preferably a normally-transmissive EC layer. By using the normally-transmissive transmission EC layer, it is possible to make a portion far from the feeding portion in a transmissive state when forming a transmission gradation by using the electrode resistance. This configuration is suitable for applications in variable apertures and apodization filters. Hereinafter, in order to simplify the description, the transmissive state and the dimming state are described assuming the normally-transmissive EC layer as an example unless otherwise described, but in the case of the normal dimming EC layer, the description of transmissive/dimming is opposite.

The EC element includes a monopole type EC element in which an electrochemical reaction proceeds at one side of a pair of electrodes and a complementary type EC element in which electrochemical reactions of redox substances proceed at both electrodes. Although either type can be used as the EC element 1009 according to the present embodiment, a complementary EC element is preferable as the floating type and self-decoloration type EC element for the reason that the dimming ratio between the transmissive state and the dimming state of the filter can be increased and the reason that will be described later.

The EC layer in a typical complementary EC element has at least one of an anodic EC compound that changes from a transmissive state to a dimming state by an oxidation reaction and a cathodic EC compound that changes from a transmissive state to a dimming state by a reduction reaction. In a floating type EC element in which an EC compound can move in an electrolyte or the like, it is necessary to apply an effective voltage to an electrode and to keep a current flowing in order to maintain a dimming state because the following reactions (1) to (4) occur.

(1) A reaction in which an anodic EC compound ($A^+$) in a dimming state (oxidized state) reaches a cathode electrode and undergoes a reduction reaction to result in a transmissive state (A) ($A^+ + e^- \rightarrow A$)

(2) A reaction in which a cathodic EC compound ($C^-$) in a dimming state (reduced state) reaches an anode electrode and undergoes an oxidation reaction to result in a transmissive state (C) ($C^- \rightarrow C + e^-$)

(3) A reaction in which an anodic EC compound in a dimming state (oxidized state) undergoes a reduction reaction with a cathodic redox substance in a reduced state (including an EC compound) to result in a transmissive state ($A^+ + C^- \rightarrow A + C$)

(4) A reaction in which a cathodic EC compound in a dimming state (reduced state) undergoes an oxidation reaction with an anodic redox substance in an oxidized state (including an EC compound) to result in a transmissive state ($C^- + C + A$)

These reactions (1) to (4) are called self-decoloration reactions, and the EC elements that produce them are called self-decoloration type EC elements. Since a self-decoloration EC element needs to keep current flowing, voltage drop due to electrode resistance is likely to occur based on Ohm's law, and effective voltage difference is likely to occur in the electrode surface. Thus, a gradation of transmittance is easily formed in the electrode of the transmittance changing portion. Therefore, as the EC element 1009 according to the present embodiment, a complementary type, a floating type, and a self-decoloration type EC element are preferably used.

Among the organic low-molecular EC compounds usable for the complementary EC element, as the anodic EC compound, an aromatic amine compound, especially a dihydrophenazine derivative, is preferably used because of its excellent durability. As the cathodic EC compound, a derivative of a pyridine salt, especially a viologen derivative, is preferably used because of its excellent durability and light absorption ability in a dimming state. Among them, the combination of the dihydrophenazine derivative and the viologen derivative is particularly preferably used because it can widely cover the absorption region of visible light and operates at a low driving voltage.

The EC element 1009 may include an electrolyte layer containing an electrolyte. The electrolyte layer may be integrally arranged with the EC layer 1002 or may be arranged so as to overlap the EC layer 1002. As the electrolyte layer, a layer in which an electrolyte is dissolved in a solvent is preferably used. The solvent is suitably selected in consideration of the solubility, vapor pressure, viscosity, potential window, and the like of solutes such as electrochromic materials, depending on the application, but is preferably a polar solvent. Specifically, examples of the solvent of the electrolyte layer include organic polar solvents such as methanol, ethanol, propylene carbonate, ethylene carbonate, dimethyl sulfoxide, dimethoxyethane, γ-butyrolactone, γ-valerolactone, sulfolane, dimethylformamide, dimethoxyethane, tetrahydrofuran, acetonitrile, propionitrile, benzonitrile, dimethylacetamide, methyl pyrrolidinone, dioxolane, and the like, and water. Among them, cyclic ester compounds are preferably used in terms of boiling point and solubility.

The EC layer 1002 may further include an electrolyte, a viscosity modifier, a UV stabilizer, or the like, as necessary. An electrolyte may be included in the EC layer in the form of the electrolytic layer described above.

A partition wall 1005 is preferably used to hold the EC layer 1002 and the electrolyte layer between the pair of electrodes 1001 and to maintain the distance between the electrodes 1001. As the partition wall 1005, a sealing material is preferably used. The sealing material is preferably a material that is chemically stable, is less permeable to gases and liquids, and does not inhibit the oxidation-reduction reaction of the EC material. As the sealing material, for example, an inorganic material such as glass frit, and the like, an organic material such as epoxy resin, acrylic resin, and the like, a metal material, and the like may be used.

The sealing material may function as a spacer for defining and holding the distance between the pair of electrodes 1001. In this case, the sealing material may contain a spacer material. When the sealing material does not have a function of defining the distance between the pair of electrodes 1001, a spacer may be separately disposed to maintain the distance between both electrodes 1001. Examples of the spacer material include inorganic materials such as silica beads, glass fibers, and the like, and organic materials such as polyimide, polytetrafluoroethylene, polydivinylbenzene, fluororubber, epoxy resin, and the like. Note that, by using these spacers, the distance between the electrodes 1001 can be defined and maintained.

(Interconnections 1004)

The EC element 1009 according to the present embodiment includes interconnections 1004 for efficiently applying a driving voltage to the pair of electrodes 1001 from an external circuit such as the driving circuit 1010. The constituent material of the interconnections 1004 is not particularly limited as long as it is a material having high conductivity per unit volume, and among them, a metal material, particularly silver, copper, aluminum, or the like is preferable. As a method of forming the interconnections 1004, a method in accordance with the characteristics of the interconnections 1004, the electrodes 1001, and the base members 1006 may be selected, and, for example, a method such as printing using a metal paste, sputtering, plating, or the like may be applied. By combining these forming methods with methods such as patterning and polishing, the interconnections 1004 having desired shapes may be formed in a desired region. The resistance of the interconnections 1004 is preferably lower than the resistance of the electrodes 1001, and more preferably one order or more lower than the resistance of the electrode 1001.

The shape and arrangement of the interconnections 1004 determine a large frame of the pattern of the transmittance gradation of the EC element 1009. As a specific example, as an arrangement of the interconnections 1004 suitable for forming a concentric transmittance gradation such as in a variable aperture or an apodization filter, an arrangement of the interconnections 1004 surrounding the outer periphery of the circular partition wall 1005 along the peripheral edge of the circular electrodes 1001 as illustrated in FIG. 3 may be noted. As an arrangement of the interconnections 1004 suitable for forming a linear transmittance gradation such as in a half ND filter, an arrangement of the interconnections 1004 positioning on one side of the square electrodes 1001 as illustrated in FIG. 2 may be noted.

(Transmittance Gradation)

The EC device 1000 according to the present embodiment forms a transmittance gradation in the transmittance changing portion 2010 of the EC element 1009. The EC element 1009 is an element whose transmittance varies depending on the effective voltage of the electrode 1001. The transmittance gradation of the EC element 1009 is formed by forming a gradation of the effective voltage in the electrodes 1001 due to a voltage drop caused by the electrode resistance of the electrodes 1001 when a current flows through the electrodes 1001.

Since the transmittance gradation formed as described above is caused by the resistance of the electrodes 1001, a different light transmissive state is formed depending on the distance from the interconnections 1004 having a lower resistance than that of the electrodes 1001. Here, a light transmissive state formed at a position in the electrodes 1001 of the transmittance changing portion 2010 close to the interconnections 1004 is defined as a first light transmissive state, and a region where the first light transmissive state is formed is defined as a first region 2001. A light transmissive state formed at a position in the electrodes 1001 farther from the interconnections 1004 than the first region 2001 is a second light transmissive state, and a region where the second light transmissive state is formed is defined as a second region 2002. In the case of a normally-transmissive EC element, the first light transmissive state becomes a low light transmissive state and the second light transmissive state becomes a high light transmissive state, and in contrast, in the case of a normally-dimming EC element, the first light transmissive state becomes a high light transmissive state and the second light transmissive state becomes a low light transmissive state.

Hereinafter, the light transmittance at the time of forming the transmittance gradation will be described with reference to the normally-transmissive EC element as an example.

When the electrode 1001 of the transmittance changing portion 2010 is viewed from a direction perpendicular to the electrode surface (e.g., a top view of FIG. 2), a region in the electrode surface where the transmittance occupies 10% in an area ratio from the side where the transmittance is low is defined as the first region 2001. In addition, a region in the electrode surface where the transmittance occupies 10% in an area ratio from the side where the transmittance is low is defined as a second region. In the present embodiment, it is preferable to use a normally-transmissive EC layer capable of making a portion far from the feeding portion transmissive. The transmittance of a normally-transmissive EC layer is opposite to that of a normally-dimming EC layer, and a normally-transmissive EC layer is suitable for applications to variable apertures and apodization filters. Also, a normally-transmissive EC layer is often more advantageous than a normally-dimming EC layer in terms of maximum transmittance. Therefore, it is preferable that the light transmittance of the first light transmissive state is lower than that of the second light transmissive state. A gradation EC element forming a transmittance gradation exhibits the effect by utilizing the difference in the light transmittance inside the element. Therefore, it is preferable that there is a sufficient difference between the light transmittance in the first light transmissive state and the light transmittance in the second light transmissive state when the EC element 1009 forms the transmittance gradation.

As an example of the specific value of the difference in the light transmittance between the first light transmissive state and the second light transmissive state at the time of formation of the transmittance gradation, the difference between the highest value and the lowest value is preferably two times or more, more preferably four times or more, and most preferably eight times or more.

(Driving Circuit 1010)

The driving circuit 1010 connected to the electrodes 1001 of the EC element 1009 of the EC device 1000 according to the present embodiment through the interconnections 1004 will be described with reference to a normally-transmissive EC element as an example. The driving circuit 1010 supplies voltage to the electrodes 1001 through the interconnections 1004 to drive the EC element 1009. The transmittance of the EC element 1009 decreases by increasing the effective voltage of the electrodes 1001. The transmittance gradation formed in the transmittance changing portion 2010 of the EC element 1009 of the EC device 1000 according to the present embodiment is formed in accordance with the effective voltage of the electrodes 1001. The gradation of the effective voltage in the electrodes 1001 is formed by a voltage drop caused by the electrode resistance when a current flows through the electrodes 1001.

When this transmittance gradation is controlled by applying a direct current, which is a typical driving method of the EC element, or applying a pulse width modulation voltage of the drive voltage/open circuit voltage, it is controlled by changing the effective voltage of the electrodes. As an example, the low transmittance region can be widened (the high transmittance region can be limited or narrowed) by increasing the effective voltage by increasing the applied voltage or by increasing the duty ratio of the drive voltage. However, when the low transmittance region of a gradation filter is widened by a driving method such as these methods, the maximum transmittance of the EC element is also decreased by increasing the effective voltage applied to the EC element. This decrease in the maximum transmittance decreases the amount of light transmitted through the filter, and when applied to a lens or a camera, there is a problem that this decrease in the maximum transmittance reduces the image quality of an acquired image due to a reduction in the signal.

Figures 4A, 4B:
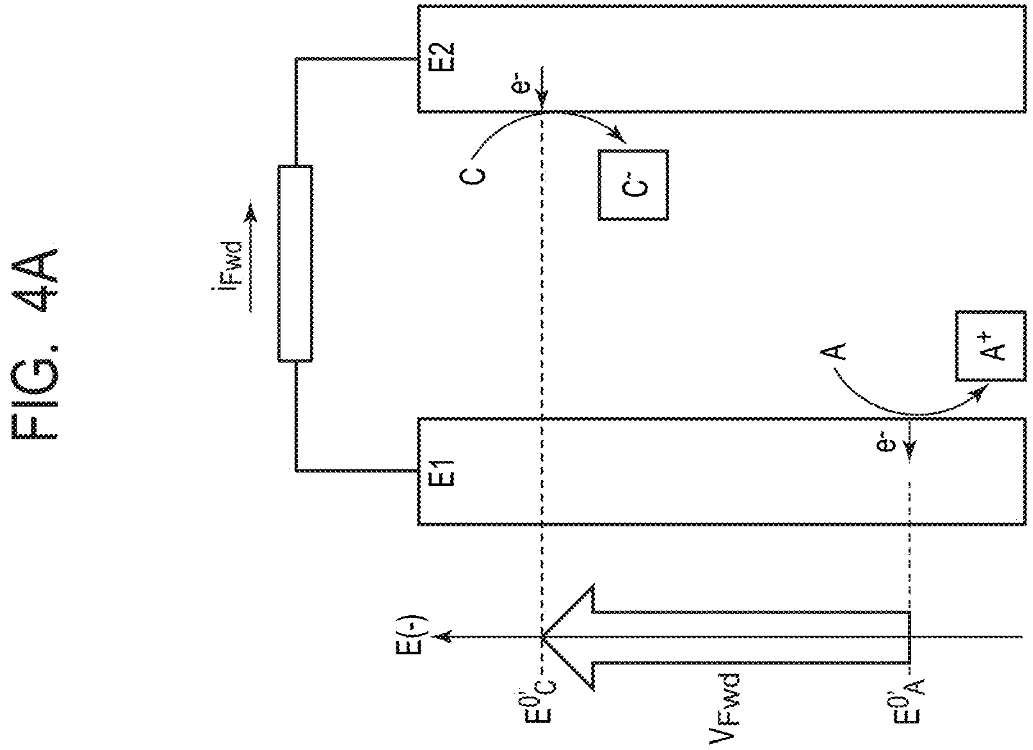
FIG. 4A is an energy diagram illustrating an overview of electrode reactions in the EC device according to the first embodiment of the present invention.
FIG. 4B is an energy diagram illustrating an overview of electrode reactions in the EC device according to the first embodiment of the present invention.

To solve this problem, the driving circuit 1010 according to the present embodiment supplies mutually different voltages to the electrodes 1001 repeatedly. That is, the driving circuit 1010 according to the present embodiment repeatedly supplies a voltage for advancing an electrochemical reaction for decreasing the transmittance of the EC layer 1002 and a voltage for advancing an electrochemical reaction for increasing the transmittance of the EC layer 1002 when controlling the gradation of the transmittance. The voltage supply by the driving circuit 1010 will be described in detail with reference to FIG. 4A and FIG. 4B, taking as an example a complementary EC element using an anodic EC compound (A) which becomes a low light transmissive state by an oxidation reaction and a cathodic EC compound (C) which becomes a low light transmissive state by a reduction reaction. FIG. 4A and FIG. 4B are energy diagrams of electrode reactions of EC devices.

FIG. 4A illustrates an electrode reaction of the EC element when a voltage ($V_{Fwd}$) for advancing an electrochemical reaction for decreasing the transmittance of the EC layer is applied. Here, for example, a case where a voltage that is a difference between the formula mass potential ($E^{0'}{}_{A}$) of the anodic EC compound and the formula mass potential ($E^{0'}{}_{C}$) of the cathodic EC compound is applied will be described. The anodic EC compound undergoes an oxidation reaction at the electrode E1 and changes into an oxide in a low light transmissive state. On the other hand, the cathodic EC compound undergoes a reduction reaction at the electrode E2 and changes into a reductant in a low light transmissive state. (In the viologen derivative, which is a typical cathodic EC compound, the high light transmissive state is dication and the low light transmissive state is monocation, but here the former is described as that corresponds to C and the latter is described as that corresponds to $C^-$.) Then, a current ($i_{Fwd}$) flows to the external circuit.

FIG. 4B illustrates a case where a voltage for advancing an electrochemical reaction for decreasing the transmittance of the EC layer ($V_{Fwd}$) is applied, followed by a voltage for advancing an electrochemical reaction for increasing the transmittance of the EC layer (here, $V_{Rev}$ which is a voltage of the opposite polarity of $V_{Fwd}$). In the vicinity of the electrode E1, there are many oxides of the anodic EC compound (low light transmissive state) generated by the application of $V_{Fwd}$, and a reaction in which these are reduced to a high light transmissive state by the application of $V_{Rev}$ rapidly proceeds. Similarly, in the vicinity of the electrode E2, there are many oxides of the cathodic EC compound (low light transmissive state) generated by the application of $V_{Fwd}$, and a reaction in which these are oxidized to a high light transmissive state by the application of $V_{Rev}$ rapidly proceeds. Then, a current ($i_{Rev}$) flows through the external circuit.

As described above, the driving circuit 1010 according to the present embodiment repeatedly supplies a voltage for advancing an electrochemical reaction for decreasing the transmittance of the EC layer 1002 and a voltage for advancing an electrochemical reaction for increasing the transmittance of the EC layer 1002 to the electrodes 1001. As a result, the driving circuit 1010 can increase a current that does not contribute to the decrease in the transmittance of the EC layer 1002. The voltage drop caused by the electrode resistance when the current flows can be controlled without changing the transmittance of the EC layer 1002 by the current that does not contribute to the decrease in the transmittance of the EC layer 1002. This makes it possible to control the gradation of the transmittance in the transmittance changing portion 2010 by controlling the gradation of the effective voltage in the electrode 1001.

A preferred example of a voltage for decreasing the transmittance of the EC layer 1002 is a value obtained by subtracting 0.2 V from the absolute value of the difference between the formula mass potential of the anodic EC compound and the formula mass potential of the cathodic EC compound or more, which varies depending on the size and resistance of the electrode 1001. Further, an absolute value of the difference between the formula mass potential of the anodic EC compound and the formula mass potential of the cathodic EC compound or more is noted as a more preferable example. The upper limit of this voltage is determined by the voltage at which the EC layer 1002 can stably repeat the transmittance change. The formula mass potential of the EC compound used for the EC layer 1002 may be estimated from the mid-point potential of the peak potential of the oxidation wave and reduction wave of cyclic voltammetry using a reference electrode in an electrolyte solution in which a single EC compound is dissolved.

On the other hand, a preferred example of a voltage for increasing an electrochemical reaction for increasing the transmittance of the EC layer 1002 is a voltage of 0 V or less when a voltage for decreasing the transmittance of the EC layer 1002 is defined as a positive voltage. A particularly preferred range of this voltage includes a voltage (negative voltage) having a polarity opposite to that of the voltage for advancing an electrochemical reaction for decreasing the transmittance of the EC layer 1002. This is because, by applying a voltage opposite to the voltage for advancing the electrochemical reaction for decreasing the transmittance of the EC layer 1002, the electrochemical reaction for decreasing the transmittance of the EC layer 1002 can proceed faster than the short circuit (application of 0 V) within a limited time range. The lower limit of this voltage is determined by the voltage at which the EC layer 1002 can stably repeat the transmittance change. A typical example of this voltage is a voltage obtained by reversing the positive and negative signs at the same absolute value of the voltage for advancing the electrochemical reaction for decreasing the transmittance of the EC layer 1002.

When controlling the transmittance gradation, the driving circuit 1010 repeatedly supplies a voltage for advancing an electrochemical reaction for decreasing the transmittance of the EC layer 1002 and a voltage for advancing an electrochemical reaction for increasing the transmittance of the EC layer 1002. The driving circuit 1010 repeatedly supplies these voltages in a time domain in which the electrochemical reaction of the EC layer 1002 in the electrodes 1001 in the first region 2001 progresses and the transmittance change of the first region 2001 is not substantially visible. Here, in the first region, means the following. That is, it means that the electrochemical reaction of the EC layer 1002 proceeds in the first region 2001 where the first light transmissive state is formed at a position relatively close to the interconnections 1004 in the electrodes 1001 in the EC element 1009, and the transmittance change is not substantially visible. This verifies the visibility of the progress of the electrochemical reaction and the transmittance change in the first region 2001, which is relatively close to the interconnections 1004 and in which the electrochemical reaction is relatively active.

The requirements for the electrochemical reaction of the EC layer 1002 at the electrodes 1001 to proceed can be explained as follows. Consider a time domain (frequency) in which a voltage for advancing an electrochemical reaction for decreasing the transmittance of the EC layer 1002 and a voltage for advancing an electrochemical reaction for increasing the transmittance of the EC layer 1002 are repeatedly supplied. As this frequency is increased, the contribution of the electrochemical reaction of the EC compound through which the Faraday current flows becomes small and the charge/discharge process through which the capacitor current flows becomes main, as a process in the electrode 1001 of the EC layer 1002. When the frequency of the repeated supply of this voltage is applied in a relatively short time domain in which the charge/discharge process is the main, a sufficient effective voltage is not applied to the charge transfer resistance corresponding to the electrochemical reaction relating to the increase and decrease of the transmittance of the EC layer 1002, and the EC layer 1002 does not become a low light transmissive state. Since this state is undesirable for forming a transmittance gradation in the transmittance changing portion 2010 of the EC element 1009, the repeated voltage supply is performed at a frequency where the electrochemical reaction of the EC compound in which the Faraday current flows proceeds and the electrochemical reaction of the EC compound in which the electrochemical reaction of the EC layer 1002 proceeds mainly. A suitable frequency range of the repeated supply for advancing the electrochemical reaction varies depending on the type and configuration of the EC element 1009. As an example of a complementary or self-decoloration type organic low molecular EC element, the frequency range is preferably 10 kHz or less, more preferably 1 kHz or less, and most preferably 300 Hz or less.

The requirement to perform the repeated voltage supply in a time domain where the change in transmittance is not substantially visible has the following two meanings. (1) When the frequency of the repeated voltage supply is lowered to a frequency lower than the electrode reaction response of the EC compound, the electrochemical reaction of the EC compound through which the Faraday current flows proceeds in the electrodes 1001 of the EC element 1009, so that the transmittance of the EC layer 1002 increases or decreases. When the increase or decrease of the transmittance is visually recognized, the light transmitted through the EC element 1009 flickers, thereby reducing the quality of the EC device 1000. The frequency range suitable for this substantially non-visibility depends on the application of the EC device 1000, particularly the detection rate of the light detector through the EC element 1009. Referring to the human eye as an example, the frequency of the repeated voltage supply is preferably 24 Hz or more, more preferably 30 Hz or more, and even more preferably 60 Hz or more from the viewpoint of preventing the increase or decrease of transmittance from being visually recognized. The frequency used is preferably selected in relation to this value and the preferred frequency of the electrochemical reaction described above. An example of a typical frequency is 60 Hz or more and 300 Hz or less. (2) The main purpose of the driving circuit 1010 according to the present embodiment is to control the steady gradation pattern of the EC element 1009 during driving. Therefore, the driving circuit 1010 repeatedly applies a voltage for advancing an electrochemical reaction for decreasing the transmittance of the EC layer 1002 and a voltage for advancing an electrochemical reaction for increasing the transmittance of the EC layer 1002 in a time domain where the transmittance change of the EC element 1009 is not substantially visible. Further, the transmittance variation width suitable for substantially not being visible is preferably 5% or less, and more preferably 1% or less.

A specific driving example of the driving circuit 1010 according to the present embodiment will be described below with reference to FIG. 5.

The driving circuit 1010 may preferably vary the ratio of the time for supplying the voltage for advancing the electrochemical reaction for increasing the transmittance of the EC layer 1002 to the time for supplying the voltage for advancing the electrochemical reaction for decreasing the transmittance of the EC layer 1002.

Figure 5:
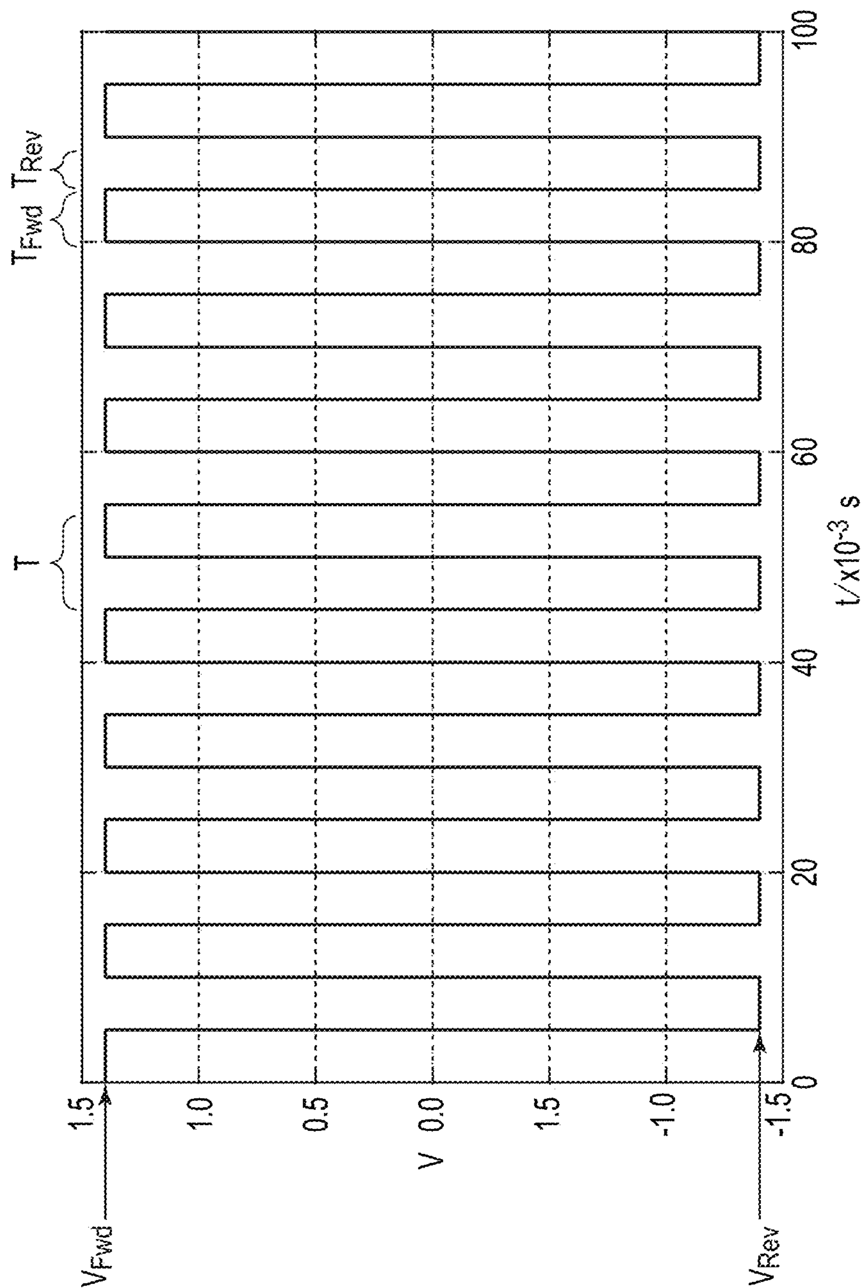
FIG. 5 is a graph illustrating an outline of a voltage application method of a driving circuit of the EC device according to the first embodiment of the present invention.

FIG. 5 is a schematic diagram for explaining an outline of a voltage application method of the driving circuit 1010 according to the present embodiment. In FIG. 5, the vertical axis represents the voltage applied from the driving circuit 1010 to the EC element 1009, and the horizontal axis represents time. As illustrated in FIG. 5, the driving circuit 1010 repeatedly applies a voltage ($V_{Fwd}$) for advancing an electrochemical reaction for decreasing the transmittance of the EC layer 1002 and a voltage ($V_{Rev}$) for advancing an electrochemical reaction for increasing the transmittance of the EC layer 1002 to the EC element 1009. The driving circuit 1010 applies this repeated voltage in a period (T), a time domain in which the electrochemical reaction of the EC layer 1002 at the electrodes 1001 in the first region 2001 progresses and the transmittance change of the first region 2001 is not substantially visible. In this case, T preferably comprises a time period $T_{Fwd}$ for applying $V_{Fwd}$ and a time period $T_{Rev}$ for applying $V_{Fwd}$. The driving circuit 1010 can preferably control the gradation of transmittance by changing the ratio of $T_{Fwd}$ to $T_{Rev}$. More specifically, when controlling the gradation of the variable transmittance of the EC element 1009, the driving circuit 1010 preferably controls the gradation of the transmittance by changing the ratio of $T_{Fwd}$ and $T_{Rev}$ in one cycle of the pulse width modulation driving.

The driving circuit 1010 according to the present embodiment may switch between the above-mentioned repeatedly applied driving method, and application of a direct current which is a typical driving method of an EC element, pulse width modulation voltage of a driving voltage/an open circuit voltage, or the like, according to circumstances and conditions. As a specific example, the driving method can be switched as follows. That is, when an apodization filter or an aperture is used and the light quantity of not only the peripheral portion but also the central portion is desired to be reduced for the reason of slow shutter photographing, moving picture photographing, or the like, a driving method for applying a direct current or pulse width modulation voltage of a driving voltage/an open circuit voltage is selected. When an apodization filter or an aperture is used, the driving method for applying the above-mentioned repeated voltage is selected when the amount of light is to be increased by preventing blurring or by photographing at a high shutter speed.

It is known that the current value for realizing the same dimming state is decreased by decrease of the temperature of the EC element. Such a decrease in the current value leads to a blunting of the effective voltage gradation and a blunting of the transmittance gradation. To cope with this, a temperature sensor is preferably arranged in the EC device 1000 according to the present embodiment. In this case, it is preferable to apply the previously set ratios of voltage and time to the measured temperature of the temperature sensor. Specifically, for example, when the temperature decreases, an electrochemical reaction for increasing the transmittance of the EC layer 1002 is advanced, and the current decreased due to the temperature decrease is compensated.

As described above, in the EC device 1000 according to the present embodiment, the driving circuit 1010 repeatedly supplies a voltage for advancing an electrochemical reaction for decreasing the transmittance of the EC layer 1002 and a voltage for advancing an electrochemical reaction for increasing the transmittance of the EC layer 1002. Thus, according to the EC device 1000 according to the present embodiment, the following effects can be obtained.

In the conventional driving by applying a direct current or a pulse width modulation voltage of a driving voltage/an open circuit voltage, since the transmittance gradation is controlled by current control by an effective voltage, there is a problem that the maximum transmittance changes simultaneously with the transmittance gradation. On the other hand, in the driving method by the driving circuit 1010 of the EC device 1000 according to the present embodiment, the voltage drop profile can be changed independently from the transmittance by performing current control by electrochemical reaction control without increasing the transmittance. Thus, in the present embodiment, it is possible to control the transmittance gradation with a high degree of freedom. As a specific effect, when applied to a lens or a camera, it is possible to acquire a high-quality image with suppressed signal degradation. When applied to glasses and windows, a desired gradation pattern can be realized and the function of the product can be improved.

As a prior example, there has been reported a method of applying a voltage having a polarity opposite to that at the time of coloring to the EC layer in order to improve the speed at the time of increasing the transmittance of the EC element having the complementary EC layer (prior example 1: Japanese Patent Application Laid-Open No. 2020-16805). In this method, by applying a voltage of a reverse polarity to the electrode, a reaction in which the EC compound in a dimming state is brought into a transmissive state is rapidly progressed. Since this method is a method for improving the speed when the transmittance of the EC element is increased, it is performed in a time domain where the transmittance change is visible.

In contrast, the EC device 1000 according to the present embodiment has a main purpose of controlling the constant gradation pattern of the EC element 1009 as described in the section of the driving circuit 1010, and the purpose is different from that of the prior example 1. Therefore, in the present embodiment, a voltage for advancing an electrochemical reaction for decreasing the transmittance of the EC layer 1002 and a voltage for advancing an electrochemical reaction for increasing the transmittance of the EC layer 1002 are repeatedly applied. In this case, in the present embodiment, the EC element 1009 is driven in a time domain where the change in transmittance is not substantially visible. In this respect, the EC device 1000 according to the present embodiment is clearly different from the configuration of the prior example 1. Specifically, if the voltage application method of the prior example 1 is applied as it is, the change in the transmittance gradation is visible, and this does not contribute to the realization of the control of the constant gradation pattern of the EC element during driving.

As another prior example, there has been reported a driving method in a case where, when performing pulse width modulation driving of a driving voltage/an open circuit voltage on an EC element, it is desired to change the EC element from a high light transmissive state to a very slightly low light transmissive state (prior example 2: Japanese Patent No. 6727755). In this method, a pair of electrodes are short-circuited when a voltage is not applied in one cycle of the pulse width modulation driving. This method deals with a case where the time of voltage application for making the EC compound in the low light transmissive state when realizing a very small low light transmissive state is smaller than the transient response time of the electrochemical reaction when using the pulse width modulation drive. In this case, the calculated value of the voltage application time for the low light transmissive state is too small to be smaller than the transient response time of the electrochemical reaction, and it is difficult to control with the pulse width modulation. In this method, only in the case of realizing such a very small low light transmissive state, a very small low light transmissive state is realized by adding a short circuit time (time for making the EC compound in a high light transmissive state) to voltage application for making the EC compound in a low light transmissive state. Further, in the prior example 2, it is described that in the case where the time for applying the voltage for making the EC compound in the low light transmissive state is larger than the transient response time of the electrochemical reaction when realizing the low light transmissive state than the very small low light transmissive state, the electrodes are not short-circuited and are open-circuited.

In contrast, the EC device 1000 according to the present embodiment forms a clear transmittance gradation in the transmittance changing portion 2010 of the EC element 1009. The transmittance gradation is formed by forming a gradation of the effective voltage in the electrodes 1001 due to a voltage drop caused by the electrode resistance when a current flows through the electrodes 1001, and by changing the transmittance of the EC element 1009 depending on the effective voltage of the electrodes. In the present embodiment, the voltage drop caused by the electrode resistance is small because the current flowing in realizing a very small low light transmissive state as in the prior example 2 is small, and a gradation of transmittance is hardly formed. Further, in the case of forming a clear low light transmissive state such that a clear transmittance gradation is formed in the transmittance changing portion 2010 of the EC element 1009 as in the EC device 1000 according to the present embodiment, the prior example 2 states that the electrodes are not short-circuited but are open-circuited. In this respect, the EC device 1000 according to the present embodiment is clearly different from the configuration of the prior example 2. Specifically, if the voltage application method of the prior example 2 is applied as it is, a transmittance gradation is not formed when a driving method for short-circuiting a pair of electrodes is adopted when no voltage is applied. In addition, in the case where a driving method (application of pulse width modulation voltage of a driving voltage/an open circuit voltage, which is a typical driving method) in which a pair of electrodes are open-circuited when a voltage is not applied is adopted, the maximum transmittance of the gradation filter also decreases at the same time. These do not contribute to the realization of the reduction of influence on the maximum transmittance in the control of the light transmission region of the EC element.

The EC device 1000 according to the present embodiment can be applied to optical applications such as a variable apodization filter, a variable aperture, a variable half ND filter, and the like. The EC device 1000 according to the present embodiment can be applied to glasses and windows. When the EC device 1000 according to the present embodiment is applied to glasses and windows, a desired gradation pattern can be realized and the function of the product can be improved. The EC device 1000 according to the present embodiment can be used as an imaging device, a lens unit, or a component attached thereto. The imaging device is applicable to a product having a combination of light quantity adjustment and an imaging element. For example, an optical filter using the EC device 1000 according to the present embodiment can be applied to a camera, a digital camera, a video camera, and a digital video camera. An optical filter using the EC device 1000 according to the present embodiment can also be applied to a product including an imaging device such as a mobile phone, a smartphone, a PC, a tablet, and the like. By using the EC device 1000 according to the present embodiment as an optical filter, it is possible to partially change the amount of light in the field angle with a high degree of freedom by one filter, and it is also effective in reducing the number of members and saving space.

Examples

Hereinafter, the present invention will be described in more detail by way of Examples, but the present invention is not limited to these Examples.

(1) Preparation of EC Element (a) Preparation of EC Element Frame

An EC element of an EC device (apodization filter device) of Example whose outline was illustrated in FIG. 3 was prepared by the following process. First, on a glass with a uniform ITO film having a sheet resistance of 60 Ω/square, a silver interconnection (15.8 mΩ/square, 2.2 mm width) was formed on the outer periphery thereof by mask sputtering so that the electrode size to be a transmittance changing portion became a circle of 46 mmϕ. Then, a UV-curable sealant mixed with 30 μm spacers as a partition wall was applied on the ITO film, and the substrates were overlapped so that the surfaces of the ITO films of the pair of the substrates faced each other, and UV light was irradiated to cure the sealant.

(b) Injection of Electrolyte Solution

Electrolyte solution (EC solution) was prepared by dissolving EC compounds and PMMA (polymethyl methacrylate resin) in propylene carbonate. As the EC compounds, a plurality of EC compounds (1) to (6) shown below, which were synthesized with reference to Japanese Patent Application Laid-Open No. 2020-95253, were used.

(1)

(2)

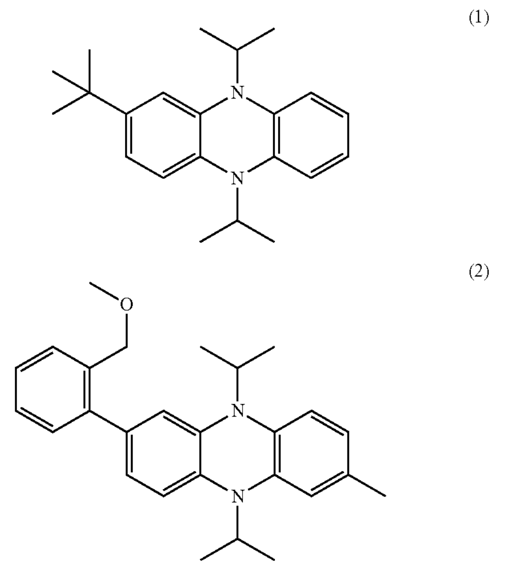

-continued (3)

(4)

(5)

(6)

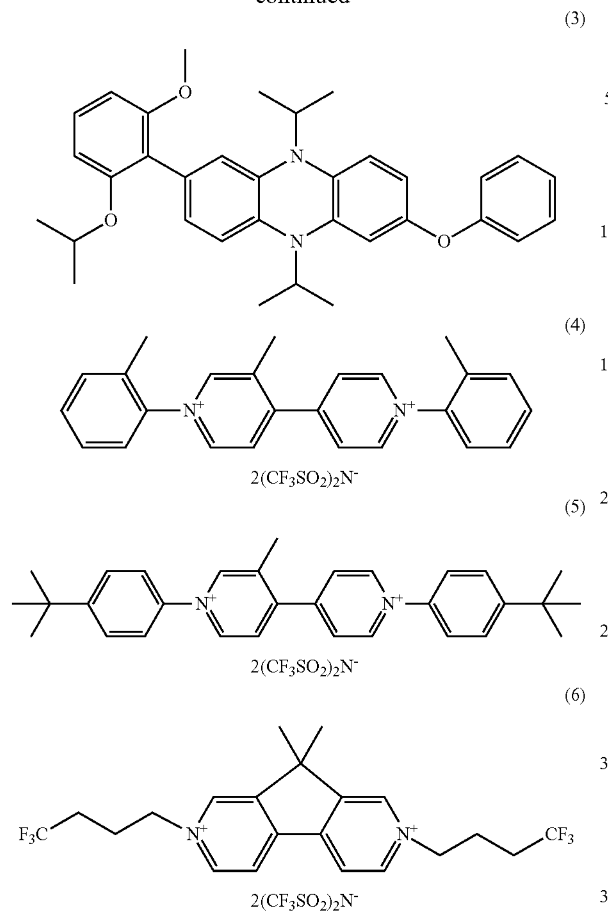

The concentrations (unit: mmol $L^{-1}$) of the EC compounds (1) to (6) in a dimming state at this time are shown in Table 1 below. The concentration of PMMA was 25 g/L. Here, the EC compounds (1) to (3) were anodic EC compounds which are dihydrophenazine derivatives. The EC compounds (4) to (6) were cathodic EC compounds which are viologen derivatives. These EC compounds were low-molecular organic materials, and the EC element using them was complementary type, floating type, and self-decoloration type low-molecular organic EC elements.

TABLE 1

| | EC Compounds | | | | | |
|---|---|---|---|---|---|---|
| | (1) | (2) | (3) | (4) | (5) | (6) |
| Concentrations in Dimming State [mmol/L] | 9.6 | 23.6 | 29.9 | 4.5 | 18.7 | 39.9 |

Next, the electrolyte solution prepared in this manner was injected into the gap serving as the EC layer through the injection port (not illustrated) provided in the partition wall, and then sealed with a UV curable sealant. Thus, an EC element was formed. The formed EC element was a self-decoloration type EC element in which the anodic EC compounds and the cathodic EC compounds were dissolved in the electrolyte solution. The EC element is a normal transmissive EC element that is in a transmissive state without applying a voltage from the driving circuit and in a dimming state by the effective voltage at the time of applying the voltage. The first light transmitting state close to the interconnection has a lower light transmittance than the second light transmitting state.

(2) Driving of EC Element (a) Advantages Over Conventional DC Driving

The EC device was configured using a potentiostat connected with a function generator as a driving circuit. Using the parameters extracted from the EC element having a unit area of 1 cm×1 cm, the transmittance of the EC element of Examples and Comparative Examples was simulated. In the transmittance simulation, the sheet resistance of the electrode was 60 Ω/square (all regions), the sheet resistance of the interconnection was 15.8 mΩ/square, the width of the interconnection was 2.2 mm, and the distance between the opposing electrodes was 30 μm.

As the driving method of Example 1, a rectangular wave of +1.4 V, which is a voltage for advancing an electrochemical reaction for decreasing the transmittance of the EC layer, and a rectangular wave of −1.4 V for advancing an electrochemical reaction for increasing the transmittance of the EC layer which became a low light transmissive state at +1.4 V, were repeatedly applied. The driving frequency at this time was selected to be 100 Hz at which the electrochemical reaction of the EC layer in the electrodes proceeds and the transmittance change in the first region, which is a low transmittance region close to the interconnection, is not substantially visible. The gradation was controlled by the ratio (duty ratio) of the applied time of +1.4 V to the total applied time. Referring to FIG. 5 to explain, in Example 1, gradation is controlled by $V_{Fwd}$=+1.4 V, $V_{Rev}$=−1.4 V, T=0.01 s (=100 Hz), and the duty ratio: $T_{Fwd}$/T. DC driving was selected as the driving method of Comparative Example 1. In Comparative Example 1, the gradation is controlled by changing the applied DC voltage.

Figures 6A, 6B:
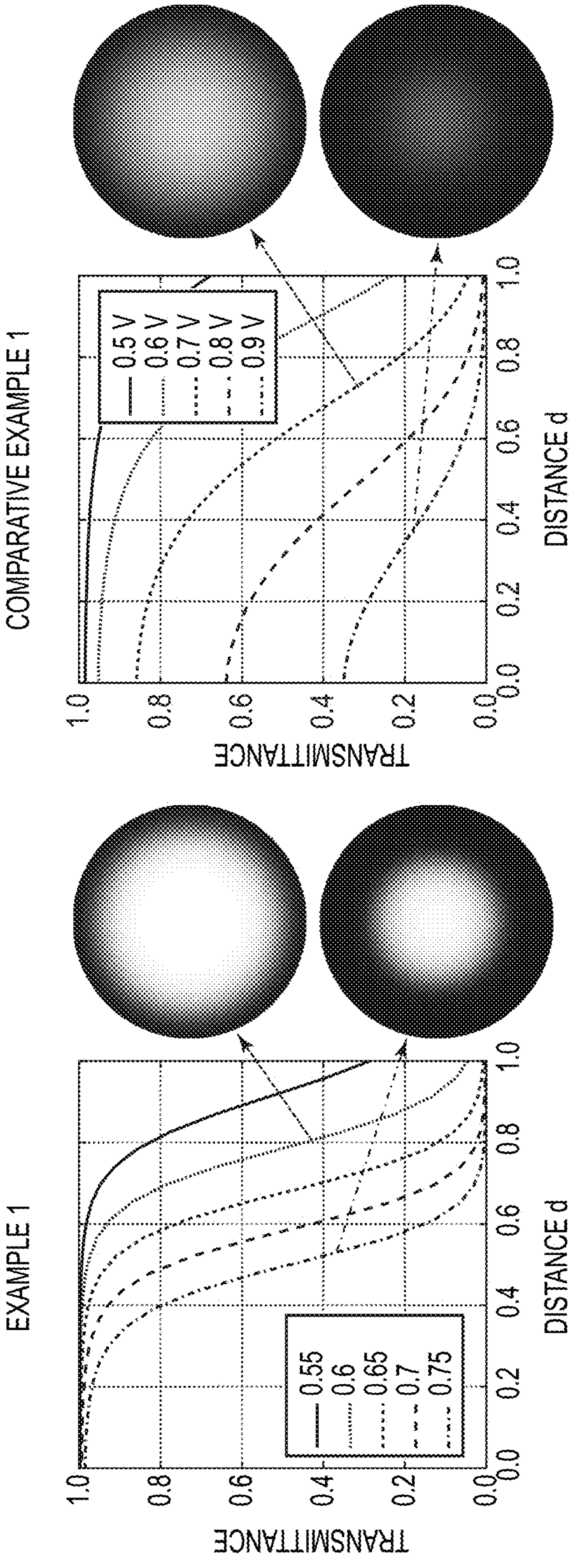
FIG. 6A illustrates a distance-transmittance profile from the center of an apodization filter of Example 1 and a corresponding transmittance image.
FIG. 6B illustrates a distance-transmittance profile from the center of an apodization filter of Comparative Example 1 and a corresponding transmittance image.

FIG. 6A and FIG. 6B show five examples of distance-transmittance profiles from the center of the apodization filter and two examples of corresponding transmission images for each of Example 1 and Comparative Example 1. In the graphs shown in FIG. 6A and FIG. 6B, the vertical axis is the light transmittance, and the horizontal axis is the distance from the center of the apodization filter (d=0.0 at center, d=1.0 at end).

FIG. 6A shows profiles at respective duty ratios when the duty ratio is changed from 0.55 to 0.75 in 0.05 steps in the apodization filter device of Example 1. From the result shown in FIG. 6A, it was confirmed that in the apodization filter device of Example 1, the low transmittance region can be changed (gradation can be controlled) with almost no decrease in the transmittance of the central portion. At this time, in the first region of the low transmittance region, the transmittance change in the steady state was almost zero, and the change was not visible.

On the other hand, FIG. 6B shows profiles at respective direct current voltages when the direct current voltage is changed from 0.5 V to 0.9 V in increments of 0.1 V in the apodization filter device of Comparative Example 1. From the result shown in FIG. 6B, it was confirmed that in the apodization filter device of Comparative Example 1, when the applied voltage is increased and the low transmittance region is expanded (gradation is controlled), the transmittance of the filter center is greatly decreased.

From the comparison between above Example 1 and Comparative Example 1, it was possible to confirm the followings.

The influence on the maximum transmittance of the EC element when controlling the light transmission region can be reduced by repeatedly supplying a voltage for advancing an electrochemical reaction for decreasing the transmittance of the EC layer and a voltage for advancing the electrochemical reaction for increasing the transmittance of the EC layer.

The influence on the maximum transmittance of the EC element when controlling the light transmission region can be reduced by repeatedly supplying voltages in a time domain where electrochemical reaction of the EC layer in the electrodes in the first region progresses and the transmittance change of the first region is substantially not visible.

The influence on the maximum transmittance of the EC element when controlling the light transmission region can be reduced by setting a voltage for advancing an electrochemical reaction for increasing the transmittance of the EC layer to a voltage having a polarity opposite to a voltage for advancing an electrochemical reaction for decreasing the transmittance of the EC layer.

An apodization filter with the reduced influence on the maximum transmittance of the EC element when controlling the light transmission region can be provided by using an appropriate driving circuit for the EC device in which the light transmittance of the first light transmissive state close to the interconnection is lower than that of the second light transmissive state far from the interconnection.

The influence on the maximum transmittance when controlling the light transmission region of the EC element can be reduced by using a driving circuit for changing the ratio of the time for supplying a voltage for advancing an electrochemical reaction for increasing the transmittance of the EC layer and a voltage for advancing an electrochemical reaction for decreasing the transmittance of the EC layer.

A driving circuit for changing the ratio of time for supplying a voltage for advancing an electrochemical reaction for increasing the transmittance of the EC layer and a voltage for advancing the electrochemical reaction for decreasing the transmittance of the EC layer in one cycle of pulse width modulation driving can be used. Thus, the influence of the EC element on the maximum transmittance at the time of controlling the light transmission region can be reduced.

(b) Superiority of Reverse Polarity Voltage Application

As the driving method of Example 2 and Example 3, cases where +0.9 V, which is a voltage for advancing an electrochemical reaction for decreasing the transmittance of the EC layer, is applied, and different voltages for advancing an electrochemical reaction for increasing the transmittance of the EC layer in the low light transmissive state at +0.9 V is applied will be described.

As the driving method of Example 2, −0.9 V was applied as a voltage for advancing an electrochemical reaction for increasing the transmittance of the EC layer in the low light transmissive state at +0.9 V. In the driving method of Example 3, 0 V was applied as a voltage for advancing an electrochemical reaction for increasing the transmittance of the EC layer in the low light transmissive state at +0.9 V. Referring to FIG. 5, in the driving method of Example 2, $V_{Fwd}$=+0.9 V, $V_{Rev}$=−0.9 V, T=0.01 s (=100 Hz), and duty ratio $T_{Fwd}$/T=0.65 were selected. In the driving method of Example 3, only $V_{Rev}$ was changed to 0 V under the same conditions as in Example 2. Here, in Example 2, the voltage having a polarity opposite to the voltage for advancing the electrochemical reaction for decreasing the transmittance of the EC layer was applied as the voltage for advancing the electrochemical reaction for increasing the transmittance of the EC layer. On the other hand, in Example 3, the voltage of 0 V, which is not the reverse polarity of the voltage for advancing the electrochemical reaction for decreasing the transmittance of the EC layer, was applied as the voltage for advancing the electrochemical reaction for increasing the transmittance of the EC layer.

Figure 7:
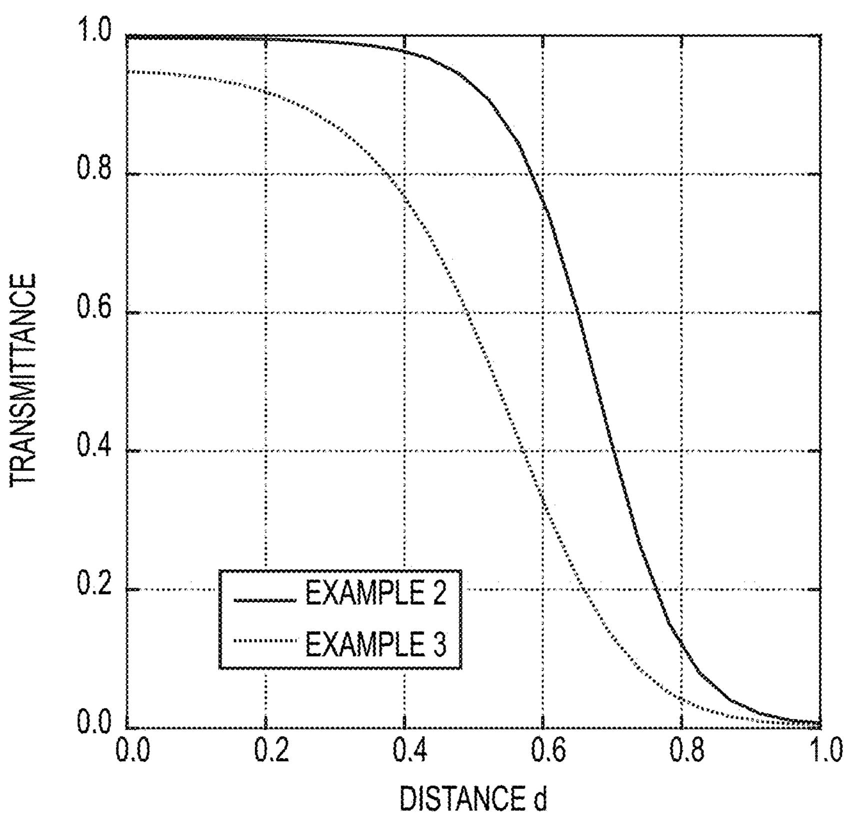
FIG. 7 illustrates distance-transmittance profiles from the center of apodization filters of Examples 2 and 3.

FIG. 7 shows distance-transmittance profiles from the center of the apodization filter for Example 2 and Example 3, respectively. It was confirmed that in the apodization filter device of Example 2 in which −0.9 V of the opposite polarity was applied, the low transmittance region could be changed with almost no decrease in the transmittance of the central portion. On the other hand, in the apodization filter device of the Example 3 in which the voltage of 0 V, which is not the opposite polarity, is applied, the transmittance of the central portion is slightly decreased.

From the result shown in FIG. 7, the effectiveness of applying a voltage having a polarity opposite to a voltage for advancing an electrochemical reaction for decreasing the transmittance of the EC layer as a voltage for advancing an electrochemical reaction for increasing the transmittance of the EC layer was confirmed. That is, it was confirmed that by applying such a voltage having an opposite polarity, the influence on the maximum transmittance when controlling the light transmission region of the gradation EC element can be reduced more effectively.

Second Embodiment

A lens unit according to a second embodiment of the present invention will be described. The lens unit according to the present embodiment may include an imaging optical system having a plurality of lenses and an optical filter. As the optical filter, the EC element of the EC device according to the first embodiment may be applied. The optical filter may include a driving circuit that drives the EC element. The optical filter may be provided between the plurality of lenses of the imaging optical system or on the outside of the lenses. The optical filter is preferably disposed on the optical axis of the lens.

By configuring the lens unit having the optical filter using the EC element of the EC device according to the first embodiment, light incident on the lens unit can be modulated according to various transmittance profiles.

Third Embodiment

Figure 8A:
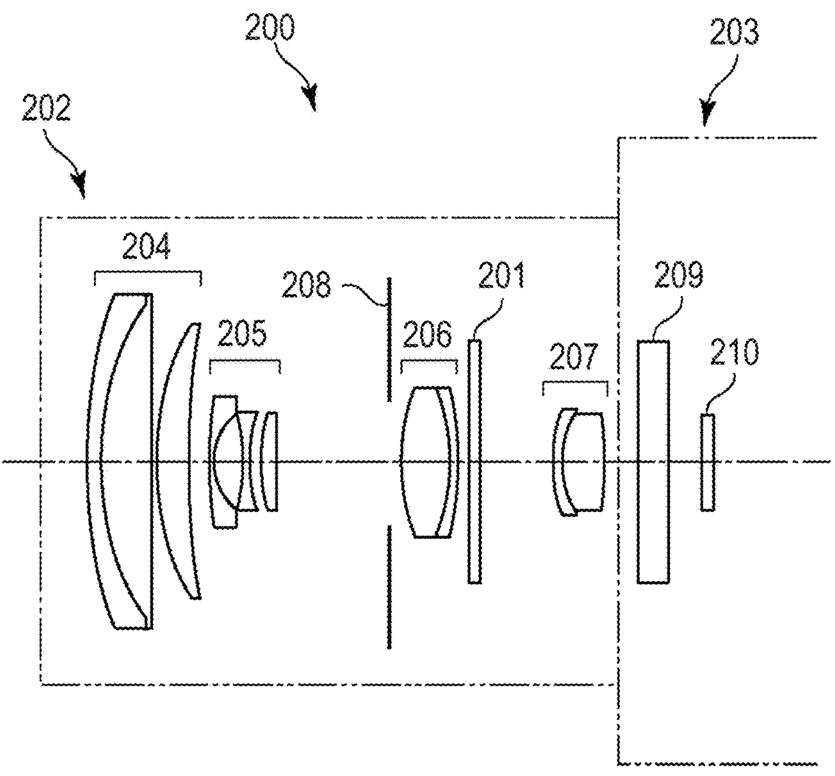
FIG. 8A is a schematic diagram illustrating an example of a configuration of an imaging device according to a third embodiment of the present invention.
Figure 8A:
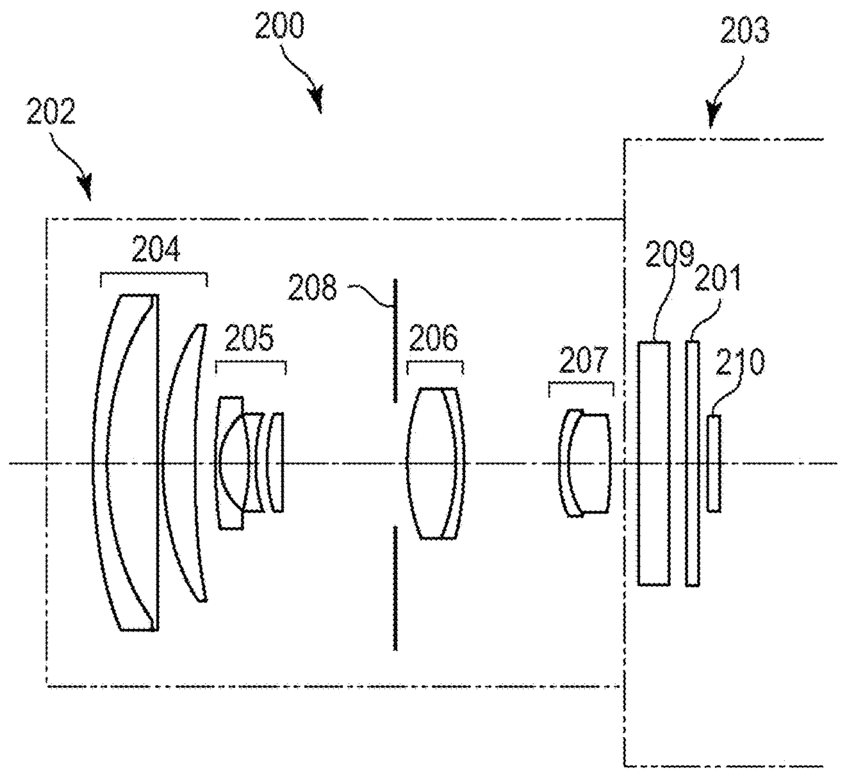

An imaging device according to a third embodiment of the present invention will be described with reference to FIG. 8A and FIG. 8B. FIG. 8A and FIG. 8B are schematic diagrams illustrating an example of the configuration of the imaging device according to the present embodiment.

The imaging device according to the present embodiment may include an optical filter and a light receiving element that receives light passing through the optical filter. Specific examples of the imaging device include a camera, a video camera, a cellular phone with a camera, and the like. The imaging device may have a form in which a main body having a light receiving element and a lens unit having a lens may be separated from each other. In a case where the imaging device can be separated by the main body and the lens unit, the present invention also includes a configuration in which an optical filter different from the imaging device is used in imaging. In such a case, examples of the arrangement position of the optical filter include outside the lens unit, between the lens unit and the light receiving element, or between a plurality of lenses (when the lens unit has a plurality of lenses).

FIG. 8A is a schematic diagram of an example of an imaging device in which an optical filter is disposed in a lens unit. FIG. 8B is a schematic diagram of an example of an imaging device in which an optical filter is disposed in an imaging device.

The imaging device 200 includes a lens unit 202 and an imaging unit 203. The lens unit 202 includes an optical filter 201 and an imaging optical system having a plurality of lenses or lens groups. The optical filter 201 is the optical filter according to the second embodiment.

FIG. 8A illustrates, as the lens unit 202, a rear focus type zoom lens that performs focusing behind the aperture. The lens unit 202 includes, in order from an object side, four lens groups, i.e., a first lens group 204 having positive refractive power, a second lens group 205 having negative refractive power, a third lens group 206 having positive refractive power, and a fourth lens group 207 having positive refractive power. Zooming is performed by varying the distance between the second lens group 205 and the third lens group 206, and focusing is performed by moving a part of the lens groups of the fourth lens group 207.

The lens unit 202 includes, for example, an aperture 208 between the second lens group 205 and the third lens group 206, and an optical filter 201 between the third lens group 206 and the fourth lens group 207. The light passing through the lens unit 202 passes through the first to fourth lens groups 204 to 207, the aperture 208, and the optical filter 201, and the amount of light can be adjusted using the aperture 208 and the optical filter 201.

The lens unit 202 is detachably connected to the imaging unit 203 via a mount member (not illustrated).

In the present embodiment, the optical filter 201 is disposed between the third lens group 206 and the fourth lens group 207 in the lens unit 202, but the imaging device 200 is not limited to this configuration. For example, the optical filter 201 may be located on the front of (on the object side) or behind (on the imaging unit 203 side) the aperture 208, or may be located on the front, behind, or inside of any of the first to fourth lens groups 204 to 207. When the optical filter 201 is arranged at a position where the light converges, there is an advantage in that the area of the optical filter 201 may be reduced.

The configuration of the lens unit 202 is not limited to the above-described configuration, and may be appropriately selected. For example, in addition to the rear focus type, an inner focus type in which focusing is performed before the aperture may be used, or another system may be used. In addition to the zoom lens, a special lens such as a fisheye lens or a macro lens may be appropriately selected.

The imaging unit 203 includes a glass block 209 and a light receiving element 210. The glass block 209 is a glass block such as a low pass filter, a face plate, or a color filter. The light receiving element 210 is a sensor unit that receives light having passed through the lens unit 202, and an imaging element such as a CCD or CMOS may be used. Alternatively, an optical sensor such as a photodiode may be used, and an optical sensor that acquires and outputs information on the intensity or wavelength of light may be used as appropriate.

As illustrated in FIG. 8A, when the optical filter 201 is incorporated into the lens unit 202, the driving device may be disposed in the lens unit 202 or may be disposed outside the lens unit 202. When the driving device is arranged outside the lens unit 202, an EC element in the lens unit 202 and the driving device are connected via wirings to control driving.

In the configuration of the imaging device 200 described above, the optical filter 201 is disposed inside the lens unit 202. However, the present invention is not limited to this configuration, and the optical filter 201 may be disposed at an appropriate position in the imaging device 200, and the light receiving element 210 may be disposed so as to receive the light passing through the optical filter 201.

For example, as illustrated in FIG. 8B, the imaging unit 203 may include the optical filter 201. FIG. 8B is a diagram for explaining another example of the configuration of the imaging device according to the present embodiment, and is a schematic diagram of the configuration of the imaging device having the optical filter 201 in the imaging unit 203. In FIG. 8B, for example, the optical filter 201 is disposed just before the light receiving element 210. When the imaging device itself incorporates the optical filter 201, the lens unit 202 itself to be connected does not have to have the optical filter 201, so that it is possible to configure an imaging device capable of dimming using the existing lens unit 202.

The imaging device 200 of the present embodiment is applicable to a product having a combination of a light amount adjustment and light receiving element. For example, the present embodiment may be applied to a camera, a digital camera, a video camera, or a digital video camera, and also to a product including an imaging device such as a cellular phone, a smartphone, a PC (Personal Computer), or a tablet PC.

According to the imaging device 200 of the present embodiment, by using the optical filter 201 as a light control member, the amount of light to be controlled may be appropriately varied by one filter, and there are advantages in that the number of members is reduced and space is saved.

Fourth Embodiment

A window member according to a fourth embodiment of the present invention will be described with reference to FIG. 9A and FIG. 9B.

The window member according to the present embodiment includes an electrochromic device 1000 according to the first embodiment, and includes an EC element 1009 and a driving circuit 1010.

The driving circuit 1010 constitutes a driving circuit that drives the EC element 1009 and adjusts the amount of light passing through the EC element 1009. The driving circuit 1010 may include an active element. Examples of the active element include a transistor, and the like. The transistor may include an oxide semiconductor such as InGaZnO, or the like in the active region. The window member according to the present embodiment may also be referred to as a transmittance variable window.

Figure 9A:
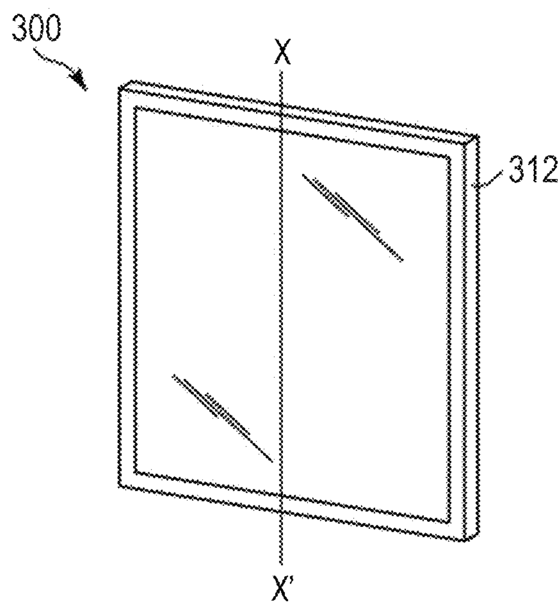
FIG. 9A is a diagram illustrating an example of a configuration of a window member according to a fourth embodiment of the present invention.
Figure 9B:
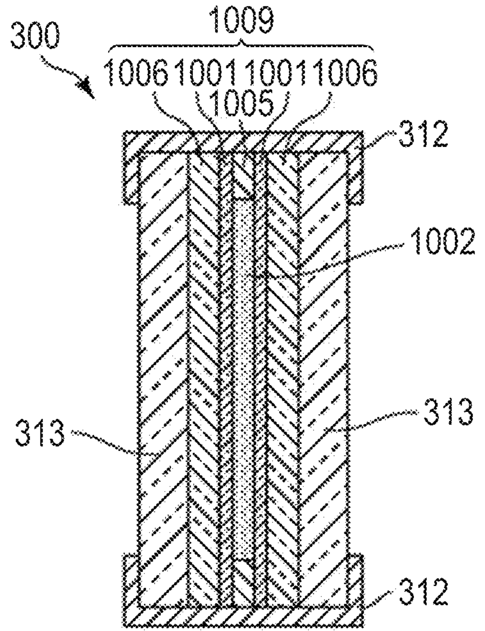
FIG. 9B is a diagram illustrating an example of a configuration of the window member according to the fourth embodiment of the present invention.

FIG. 9A is a schematic view illustrating a dimming window as a window member using an EC element, and FIG. 9B is a schematic view illustrating a cross-sectional view taken along line X-X' of FIG. 9A. The dimming window 300 of the present embodiment includes an EC element 1009 (optical filter), transparent plates 313 which are substrates sandwiching the EC element 1009, and a frame 312 surrounding and integrating the entirety. The driving circuit 1010 may be integrated within the frame 312 or may be disposed outside the frame 312 and connected to the EC element 1009 through wirings.

The transparent plates 313 are not particularly limited as long as it is a material having a high light transmittance, and is preferably a glass material in consideration of use as a window. The frame 312 may be made of any material, but may generally be considered as a frame that covers at least a portion of the EC element 1009 and has an integrated configuration. Although the EC element 1009 is a component independent of the transparent plates 313 in FIG. 9A and FIG. 9B, for example, the base members 1006 of the EC element 1009 may be regarded as the transparent plates 313.

The dimming window 300 may be applied to, for example, an application for adjusting the amount of sunlight incident on a room during a daytime. Since the dimming window 300 may be applied also to adjustment of the amount of heat in addition to the amount of sunlight, it may be used to control the brightness and temperature of the room. Further, the dimming window 300 may be applied also to an application in which a view from outside to inside is blocked as a shutter. Such a dimming window 300 may be applicable not only to glass windows for buildings, but also to windows for vehicles such as automobiles, trains, airplanes, ships and the like.

Modification Embodiment

The present invention is not limited to the above-described embodiments, and various modifications are possible.

For example, an example in which a configuration of a part of any embodiment is added to another embodiment or an example in which a configuration of a part of another embodiment is substituted is also an embodiment of the present invention.

In the above embodiments, the EC element according to the present invention is applied to the optical filter, the lens unit, the imaging device, and the window member, but the application example of the EC element according to the present invention is not limited thereto.

For example, an EC mirror may be formed by providing a reflecting member in one light path of the EC element. The EC mirror may be provided in an automobile as an antiglare mirror. The EC mirror may include an EC element and a reflecting member inside or outside the EC element. Having a reflective member therein indicates that the electrode of the EC element is reflective. Having the reflecting member outside means that the reflecting member is provided in contact with the transparent electrode of the EC element or through another transparent member.

It should be noted that the above embodiments are merely examples of embodiments of the present invention, and the technical scope of the present invention should not be interpreted in a limited manner with these embodiments. That is, the present invention can be practiced in a variety of ways without departing from its technical idea or its principal features.

According to the present invention, it is possible to provide an EC device capable of decreasing the influence on the maximum transmittance of an EC element when controlling the light transmission region.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-172245, filed Oct. 21, 2021, which is hereby incorporated by reference herein in its entirety.

What is claimed is:

1. An electrochromic device comprising:

an electrochromic element including a pair of electrodes, an electrochromic layer disposed between the pair of electrodes, and interconnections connected to the pair of electrodes; and a driving circuit that is connected to the pair of electrodes and supplies voltages to the pair of electrodes via the interconnections, wherein the electrochromic element is an electrochromic element that forms a gradation of transmittance in a transmittance changing portion where the electrochromic layer is disposed, by resistance of the electrodes, wherein the transmittance changing portion has a first region for forming a first light transmissive state at a position in the electrodes close to the interconnections in the transmittance changing portion, and a second region for forming a second light transmissive state at a position in the electrodes farther from the interconnections than the first region, wherein, the driving circuit repeatedly supplies, when controlling the gradation of the transmittance, a first voltage for advancing an electrochemical reaction for decreasing transmittance of the electrochromic layer and a second voltage for advancing an electrochemical reaction for increasing the transmittance of the electrochromic layer, in a frequency in which the electrochemical reaction of the electrochromic layer in the electrodes progresses in the first region and transmittance change of the first region is not visible, and wherein the frequency at which the driving circuit repeatedly supplies the first voltage and the second voltage is 24 Hz or more.

2. The electrochromic device according to claim 1, wherein the second voltage is a voltage having a polarity opposite to a voltage for advancing an electrochemical reaction for decreasing the transmittance of the electrochromic layer.

3. The electrochromic device according to claim 1, wherein the first light transmissive state has a lower light transmittance than the second light transmissive state.

4. The electrochromic device according to claim 1, wherein, at a time of formation of the gradation of the transmittance, difference in light transmittance between the first light transmissive state and the second light transmissive state is two times or more between a highest value and a lowest value.

5. The electrochromic device according to claim 1, wherein the driving circuit controls the gradation of the transmittance by varying a ratio of time for supplying the first voltage and the second voltage.

6. The electrochromic device according to claim 1, wherein the frequency is 60 Hz or more.

7. The electrochromic device according to claim 6, wherein the frequency is 60 Hz to 300 Hz.

8. The electrochromic device according to claim 1, wherein the driving circuit supplies, when controlling the gradation of the transmittance, the first voltage and the second voltage in one cycle of pulse width modulation driving.

9. The electrochromic device according to claim 1, wherein the electrochromic element is a complementary electrochromic element in which the electrochromic layer has at least one of an anodic electrochromic compound and a cathodic electrochromic compound.

10. The electrochromic device according to claim 9, wherein the electrochromic element is a self-decoloration type electrochromic element.

11. The electrochromic device according to claim 9, wherein the anodic electrochromic compound is a dihydrophenazine derivative.

12. The electrochromic device according to claim 9, wherein the anodic electrochromic compound is a derivative of a pyridine salt.

13. A lens unit comprising:

the electrochromic device according to claim 1; and an imaging optical system having a plurality of lenses.

14. An imaging device comprising:

the electrochromic device according to claim 1; and an imaging element configured to receive a light transmitted through the electrochromic element of the electrochromic device.

15. A window member comprising:

the electrochromic device according to claim 1; and substrates that sandwich the electrochromic element of the electrochromic device.

16. A driving method of an electrochromic element including a pair of electrodes, an electrochromic layer disposed between the pair of electrodes, and interconnections connected to the pair of electrodes, wherein the electrochromic element is an electrochromic element that forms a gradation of transmittance in a transmittance changing portion where the electrochromic layer is disposed, by resistance of the electrodes, and wherein the transmittance changing portion has a first region for forming a first light transmissive state at a position in the electrodes close to the interconnections in the transmittance changing portion, and a second region for forming a second light transmissive state at a position in the electrodes farther from the interconnections than the first region, the driving method comprising:

repeatedly supplying, when supplying voltages to the pair of electrodes via the interconnections and controlling the gradation of the transmittance, a first voltage for advancing an electrochemical reaction for decreasing transmittance of the electrochromic layer and a second voltage for advancing an electrochemical reaction for increasing the transmittance of the electrochromic layer, in a frequency in which the electrochemical reaction of the electrochromic layer in the electrodes progresses in the first region and transmittance change of the first region is not visible, wherein the frequency at which the first voltage and the second voltage are repeatedly supplied is 24 Hz or more.

* * * * *